US011365586B2

(12) United States Patent
Chambers et al.

(10) Patent No.: US 11,365,586 B2
(45) Date of Patent: Jun. 21, 2022

(54) STEERING SYSTEM FOR USE WITH A DRILL STRING

(71) Applicant: Halliburton Energy Services, Inc., Houston, TX (US)

(72) Inventors: Larry DeLynn Chambers, Kingwood, TX (US); Neelesh V. Deolalikar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/758,501

(22) PCT Filed: Feb. 2, 2018

(86) PCT No.: PCT/US2018/016746
§ 371 (c)(1),
(2) Date: Apr. 23, 2020

(87) PCT Pub. No.: WO2019/133033
PCT Pub. Date: Jul. 4, 2019

(65) Prior Publication Data
US 2020/0325731 A1 Oct. 15, 2020

Related U.S. Application Data

(60) Provisional application No. 62/612,168, filed on Dec. 29, 2017.

(51) Int. Cl.
*E21B 7/06* (2006.01)
*E21B 4/02* (2006.01)
(Continued)

(52) U.S. Cl.
CPC .............. *E21B 7/068* (2013.01); *E21B 7/062* (2013.01); *E21B 4/02* (2013.01); *E21B 34/06* (2013.01);
(Continued)

(58) Field of Classification Search
CPC .......... E21B 7/068; E21B 7/062; E21B 34/06; E21B 47/024; E21B 7/06; E21B 7/04; F16K 11/0743
See application file for complete search history.

(56) References Cited

U.S. PATENT DOCUMENTS 3,503,445 A 3/1970 Cochrum et al.
4,082,298 A 4/1978 Lawrence
(Continued)

FOREIGN PATENT DOCUMENTS

EP 0530045 3/1993
EP 0841462 2/2003
(Continued)

OTHER PUBLICATIONS

ISRWO International Search Report and Written Opinion for PCT/US2018/016746 dated Sep. 6, 2018.
(Continued)

*Primary Examiner* — Dany E Akakpo
(74) *Attorney, Agent, or Firm* — Benjamin Ford; C. Tumey Law Group PLLC

(57) ABSTRACT

A drill string steering system includes a flow manifold and a rotary valve. An actuation flow channel and a backflow channel are rotatable with respect to piston flow channels of the flow manifold. The actuation flow channel is rotatable relative to the flow manifold to increase or decrease flow toward the piston for controlling actuation of the piston. The backflow channel is rotatable relative to the flow manifold to increase or decrease flow away from the piston to the annulus for controlling retraction of the piston.

14 Claims, 11 Drawing Sheets

(51) Int. Cl.
　　　*E21B 34/06*　　　(2006.01)
　　　*E21B 47/024*　　(2006.01)
　　　*F16K 11/074*　　(2006.01)

(52) U.S. Cl.
　　　CPC ......... *E21B 47/024* (2013.01); *F16K 11/0743* (2013.01)

(56) References Cited

U.S. PATENT DOCUMENTS

| | | | |
|---|---|---|---|
| 5,553,678 A * | 9/1996 | Barr | E21B 47/01 175/73 |
| 2012/0160565 A1 | 6/2012 | Downton et al. | |
| 2015/0376948 A1 | 12/2015 | Snyder et al. | |
| 2016/0222734 A1 | 8/2016 | Winslow et al. | |
| 2017/0159362 A1 | 6/2017 | Janes et al. | |
| 2018/0171766 A1 * | 6/2018 | Clingman | E21B 43/128 |
| 2019/0153820 A1 * | 5/2019 | Lorenson | F04C 14/24 |
| 2020/0011135 A1 | 1/2020 | Deolalikar et al. | |

FOREIGN PATENT DOCUMENTS

| | | | |
|---|---|---|---|
| JP | 2003028322 | 1/2003 | |
| WO | WO-2014107232 A2 * | 7/2014 | E21B 7/068 |

OTHER PUBLICATIONS

Canadian Search Report and Written Opinion for Application No. 16516-2188/HGA, dated Jun. 29, 2021.

\* cited by examiner

STEERING SYSTEM FOR USE WITH A DRILL STRING

TECHNICAL FIELD

The present description relates in general to downhole tools, and more particularly, for example and without limitation, to steering systems for use with a drill string and methods of use thereof.

BACKGROUND OF THE DISCLOSURE

In the oil and gas industry, wellbores are commonly drilled to recover hydrocarbons such as oil and gas.

To reach desired subterranean formations, it is often required to undertake directional drilling, which entails dynamically controlling the direction of drilling, rather than simply drilling a nominally vertical wellbore path. Directionally drilled wellbores can include portions that are vertical, curved, horizontal, and portions that generally extend laterally at any angle from the vertical wellbore portions.

BRIEF DESCRIPTION OF THE DRAWINGS

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

This section provides various example implementations of the subject matter disclosed, which are not exhaustive. As those skilled in the art would realize, the described implementations may be modified without departing from the scope of the present disclosure. Accordingly, the drawings and description are to be regarded as illustrative in nature and not restrictive.

The present description relates in general to downhole tools, and more particularly, for example and without limitation, to steering systems for use with a drill string and methods of use thereof.

A directional drilling technique can involve the use of a rotary steerable drilling system that controls an azimuthal direction and/or degree of deflection while the entire drill string is rotated continuously. Rotary steerable drilling systems typically involve the use of an actuation mechanism that helps the drill bit deviate from the current path using either a "point the bit" or "push the bit" mechanism. In a "point the bit" system, the actuation mechanism deflects and orients the drill bit to a desired position by bending the drill bit drive shaft within the body of the rotary steerable assembly. As a result, the drill bit tilts and deviates with respect to the wellbore axis. In a "push the bit" system, the actuation mechanism is used to instead push against the wall of the wellbore, thereby offsetting the drill bit with respect to the wellbore axis. While drilling a straight section, the actuation mechanism remains disengaged so that there is generally no pushing against the formation, or optionally uniformly engaged, so there is no appreciable offset of the drill bit with respect to the wellbore axis. As a result, the drill string proceeds generally concentric to the wellbore axis. Yet another directional drilling technique, generally referred to as the "push to point," encompasses a combination of the "point the bit" and "push the bit" methods. Rotary steerable systems may utilize a plurality of steering pads that can be actuated in a lateral direction to control the direction of drilling, and the steering pads may be controlled by a variety of valves and control systems.

An aspect of at least some embodiments disclosed herein is that by directing mud flow within the steering system, operation of the steering system can be optimized. A further aspect, according to at least some embodiments disclosed herein is that by relieving fluid pressure on a pad pusher, overall steering force can be reduced and steering response can be increased. Yet another aspect, according to at least some embodiments disclosed herein is that by utilizing a relief flow channel within a pad pusher, the response of the pad pusher can be fine-tuned. Yet another aspect, according to at least some embodiments disclosed herein is that by utilizing a relief flow channel within a pad pusher, the immediate area can be cleared of debris.

Figure 1:
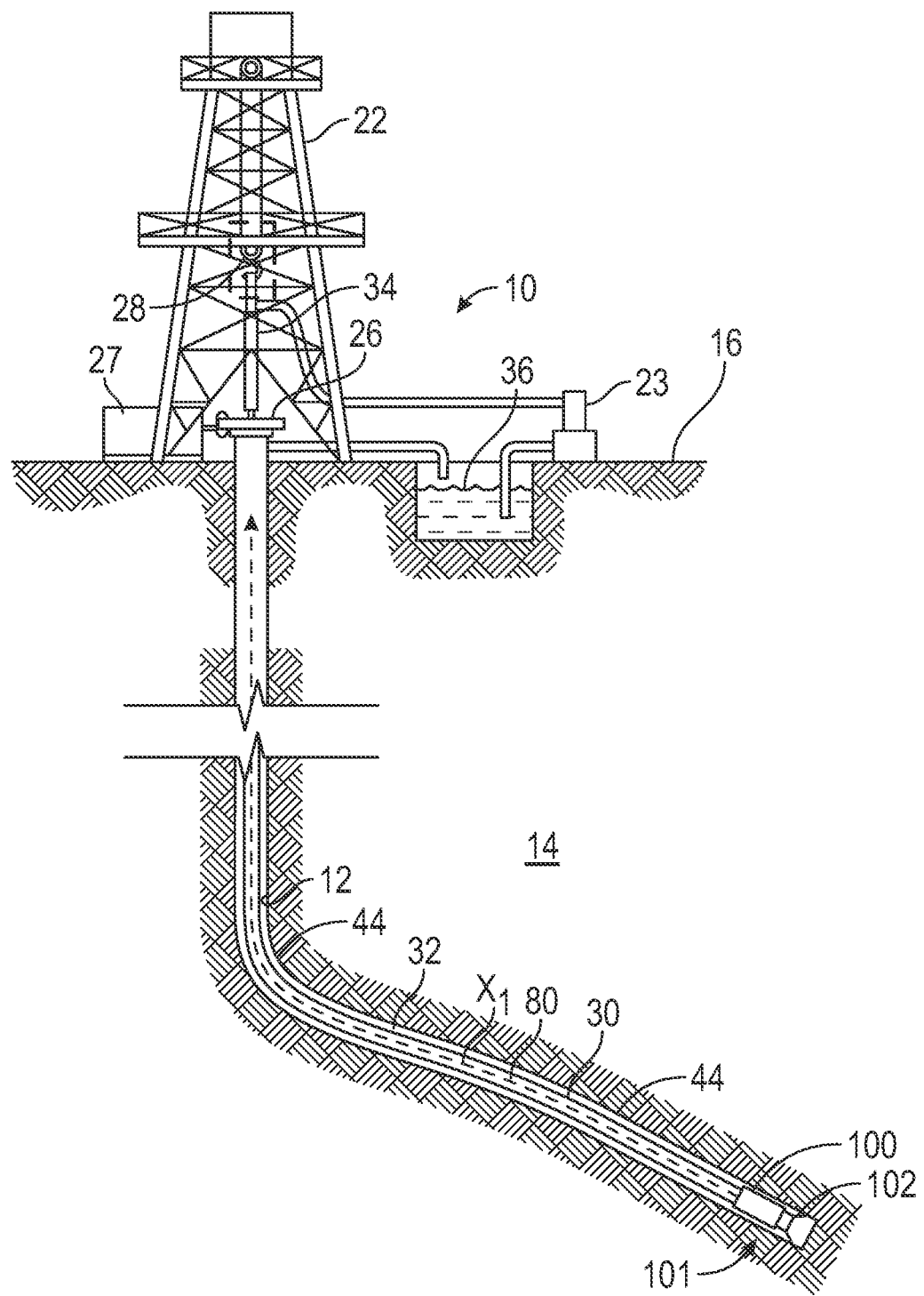
FIG. 1 illustrates a partial cross-sectional view of an onshore well system including a downhole tool illustrated as part of a tubing string, according to some embodiments of the present disclosure.
Figure 2:
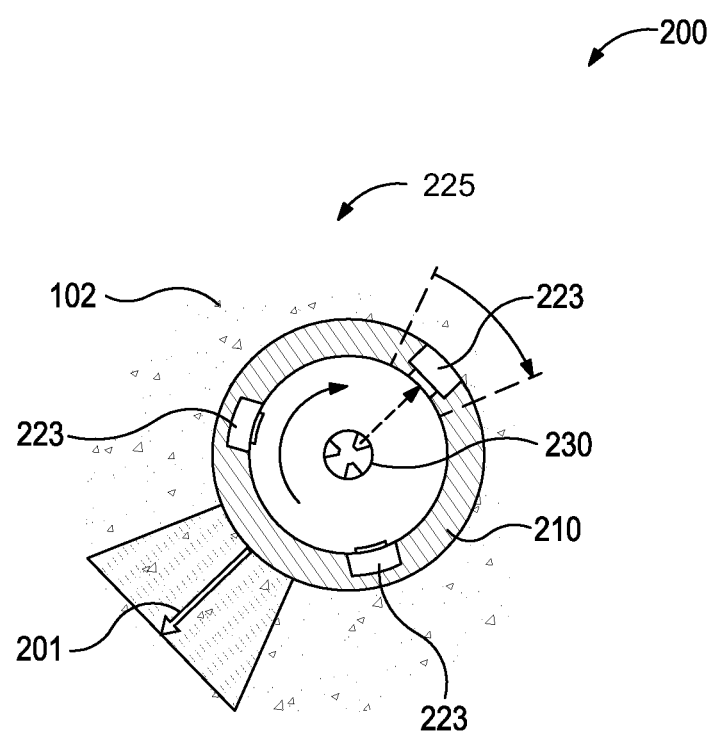
FIG. 2 is a cross-sectional view of a drill string steering system, according to some embodiments of the present disclosure.

FIG. 1 shows a representative elevation view in partial cross-section of an onshore well system 10 which can include a drilling rig (or derrick) 22 at the surface 16 used to extend a tubing string 30 into and through portions of a subterranean earthen formation 14. The tubing string 30 can carry a drill bit 102 at its end, which can be rotated to drill through the formation 14. A bottom hole assembly (BHA) 101 interconnected in the tubing string 30 proximate the drill bit 102 can include components and assemblies (not expressly illustrated in FIG. 1), such as, but not limited to, logging while drilling (LWD) equipment, measure while drilling (MWD) equipment, a bent sub or housing, a mud motor, a near bit reamer, stabilizers, steering assemblies, and other downhole instruments. The BHA 101 can also include a downhole tool 100 that can provide steering to the drill bit 102, mud-pulse telemetry to support MWD/LWD activities, stabilizer actuation through fluid flow control, and a rotary steerable tool used for steering the wellbore 12 drilling of the drill bit 102. Steering of the drill bit 102 can be used to facilitate deviations 44 as shown in FIGS. 1 and 2, and/or steering can be used to maintain a section in a wellbore 12 without deviations, since steering control can also be needed to prevent deviations in the wellbore 12.

At the surface location 16, the drilling rig 22 can be provided to facilitate drilling the wellbore 12. The drilling rig 22 can include a turntable 26 that rotates the tubing string 30 and the drill bit 102 together about the longitudinal axis X1. The turntable 26 can be selectively driven by an engine 27, and selectively locked to prohibit rotation of the tubing string 30. A hoisting device 28 and swivel 34 can be used to manipulate the tubing string 30 into and out of the wellbore 12. To rotate the drill bit 102 with the tubing string 30, the turntable 26 can rotate the tubing string 30, and mud can be circulated downhole by mud pump 23. The mud may be a calcium chloride brine mud, for example, which can be pumped through the tubing string 30 and passed through the downhole tool 100. In some embodiments, the downhole tool 100 can include a steering head, and a rotary valve that selectively applies pressure to at least one output flow path to hydraulically actuate pad pushers of the steering head. Additionally, the mud can be pumped through a mud motor (not expressly illustrated in FIG. 1) in the BHA 101 to turn the drill bit 102 without having to rotate the tubing string 30 via the turntable 26.

Although the downhole tool 100 is shown and described with respect to a rotary drill system in FIG. 1, those skilled in the art will readily appreciate that many types of drilling systems can be employed in carrying out embodiments of the disclosure. For example, drills and drill rigs used in embodiments of the disclosure may be used onshore (as depicted in FIG. 1) or offshore (not shown). Offshore oilrigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

While not specifically illustrated, those skilled in the art will readily appreciate that the BHA 101 may further include various other types of drilling tools or components such as, but not limited to, a steering unit, one or more stabilizers, one or more mechanics and dynamics tools, one or more drill collars, one or more accelerometers, one or more magnetometers, and one or more jars, and one or more heavy weight drill pipe segments.

Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as wellbore construction for river crossing tunneling and other such tunneling wellbores for near surface construction purposes or wellbore u-tube pipelines used for the transportation of fluids such as hydrocarbons.

FIG. 2 is a cross-sectional view of a drill string steering system, according to some embodiments of the present disclosure. In the depicted example, the drill string steering system 200 utilizes a steering head 225 including one or more pad pushers 223 extending from the tool body 210 to push against the earth 102 to provide a drilling vector 201. In the depicted example, the force of each pad pusher 223 of the drill string steering system 200 can be combined to provide the desired drilling vector 201. Further, in some embodiments, the timing and the duration of force of each pad pusher 223 can be controlled to control the desired drilling vector 201. In some embodiments, the drill string steering system 200 includes three pad pushers 223.

In the depicted example, the valve body 230 can be controlled to direct drilling fluid flow to selectively urge the pad pusher 223 with a desired force, timing, and/or duration, thereby steering the drill string and drill bit in the desired drilling vector 201.

Figure 3:
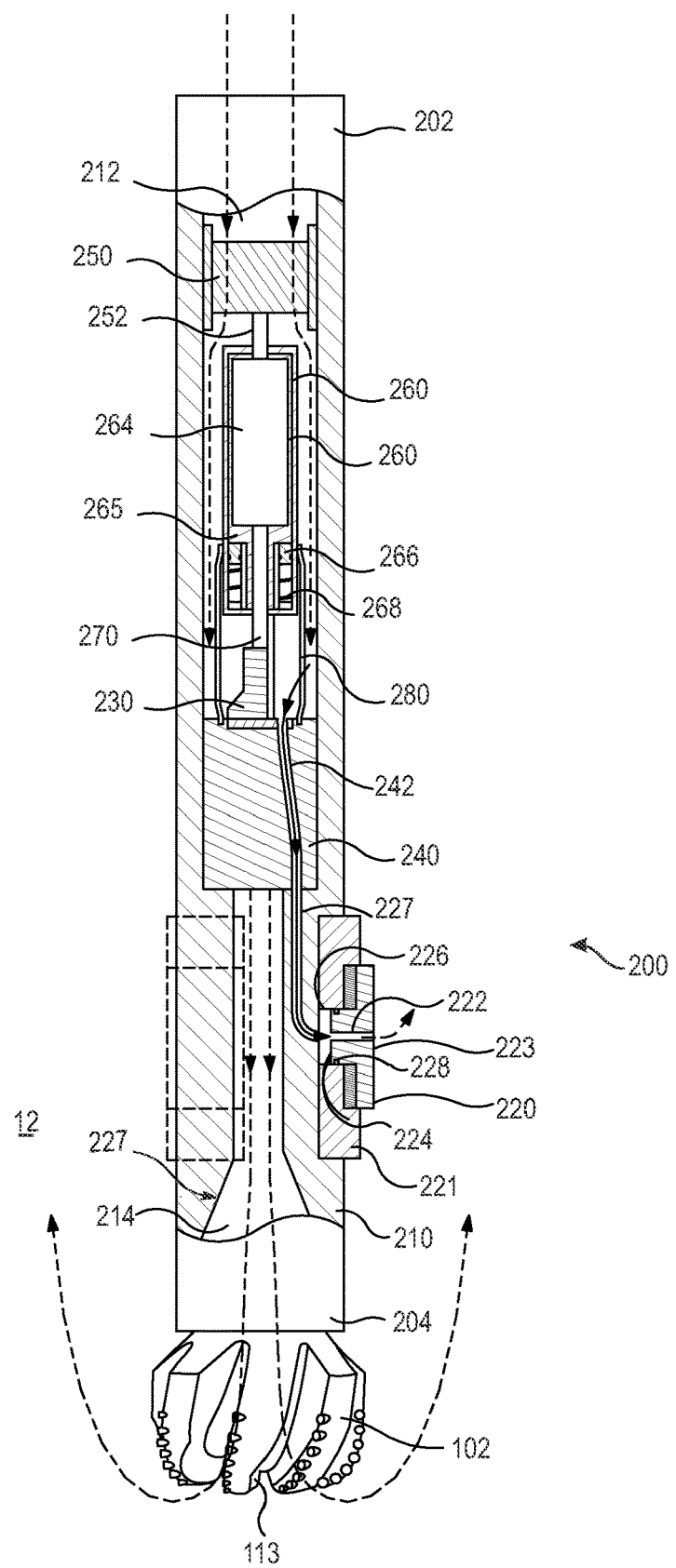
FIG. 3 illustrates a cross-sectional view of an exemplary drill string system of the downhole tool of FIG. 1, according to some embodiments of the present disclosure.

FIG. 3 illustrates a cross-sectional view of an exemplary drill string system of the downhole tool of FIG. 1, according to some embodiments of the present disclosure. In the depicted example, mud flows into the drill string steering system 200 from the uphole end, and passes through the central bore 212 to a valve body 230 and a flow manifold 240 to control mud flow to and the extension of the pad pushers 223.

As the mud flows through the central bore 212, the mud can flow through a turbine 250 and past an electric generator, steering controller, and electric motor assembly 260 to the valve body 230 and the flow manifold 240. The electric generator, steering controller, and electric motor assembly 260 are used to control the angular position of the rotary valve 230. In the depicted example, mud flow can pass through a filter screen 280 prior to passing through the valve body 230 and the flow manifold 240. The filter screen 280 can include apertures or openings sized to allow the flow of mud while preventing debris from passing through the flow manifold 240 and to components downstream of the flow manifold 240 to prevent obstruction and damage to the downstream components. The filter screen 280 can be formed from a metallic or ceramic perforated cylinder or mesh or any other suitable filter material.

In the depicted example, the valve body 230 and the flow manifold 240 control the flow of the mud there through to control the extension of the pad pushers 223. In some embodiments, the rotation of the valve body 230 abutted against the flow manifold 240 controls the flow of mud through the flow manifold 240. The valve body 230 is rotated by a motor 264 within a motor assembly 260.

In the depicted example, as mud flow is permitted by the valve body 230, the mud flow can continue in a piston flow channel 242 of the flow manifold 240. In some embodiments, a piston flow channel 242 can pass through the flow manifold 240 and the tool body 210 to provide mud flow to a piston bore 226. In the depicted example, the tool body 210 can include one or more piston bores 226 formed in the tool body 210. In some embodiments, the piston bores 226 are disposed within pad retention housings 221 formed within the tool body 210. In the depicted example, mud flow from the piston flow channel 242 is received by the piston bore 226 and the piston seals 228 to actuate and extend the piston 224 of the pad pusher 223. In some embodiments, a steering pad 220 can be integrally formed or otherwise coupled to the piston 224. As described herein, the combination of the steering pad 220 and the piston 224, whether being formed as separate parts that are coupled together, or being formed as a part of a single, continuous body, shall be referred to as a pad pusher 223. The pad pusher 223 may be actuated by the mud flow provided through the piston flow channel 242, to extend the steering pad 220 radially outward against the wall of the wellbore 12.

Pressure against the pad pusher 223 can be relieved by a relief flow channel 222 formed through the pad pusher 223. Mud flow can pass through the relief channel 222 to allow for maintaining or reducing pressure upon the piston 224 to facilitate the retraction of the piston 224 when the rotary valve 230 is has closed mud flow to that piston.

In some embodiments, the mud flow can bypass the filter screen 280 and the flow manifold 240 to continue through the central bore 212 as a bypass flow 214. The bypass flow 214 can continue through the downhole end 204 of the drill string steering system 200 and can be directed to the bit nozzles 113 of the drill bit 102 to be circulated into an annulus of the wellbore 12.

In the depicted example, the valve body 230 is rotated by a motor 264, which is an electrical motor that can be controlled to provide a desired drilling vector. In the depicted example, the motor 264 is contained within a motor housing 262 and rotates the valve body 230 via a motor shaft 270. In some embodiments, the motor 264 maintains the valve body 230 in a geostationary position as needed.

In the depicted example, components of the electric generator, steering controller, electric motor assembly 260 can be disposed, surrounded, bathed, lubricated, or otherwise exposed to a lubricant 265 within the motor housing 262 while many of the controller electronic components are protected in a protective pressure barrier cavity (not shown). In some embodiments, the lubricant 265 is oil that is isolated from the mud within the wellbore 12. In the depicted example, the pressure of the lubricant 265 can be balanced with the downhole pressure of the mud. In some embodiments, a compensation piston 266 can pressurize the lubricant 265 to the same pressure as the surrounding mud without allowing fluid communication or mixing of the mud and the lubricant 265. In some embodiments, a biasing spring 268 can act upon the compensation piston 266 to provide additional pressure to the lubricant 265 within the motor housing 262 relative to the pressure of the mud. In some embodiments, the biasing spring 268 can impart around 25 psi of additional pressure, over the mud pressure, to the lubricant 265 within the motor housing 262.

In the depicted example, electrical energy for the motor 264 is generated by mud flow passing through the turbine 250. In some embodiments, the turbine 250 can rotate about a turbine shaft 252 and power an electric motor.

Figure 4:
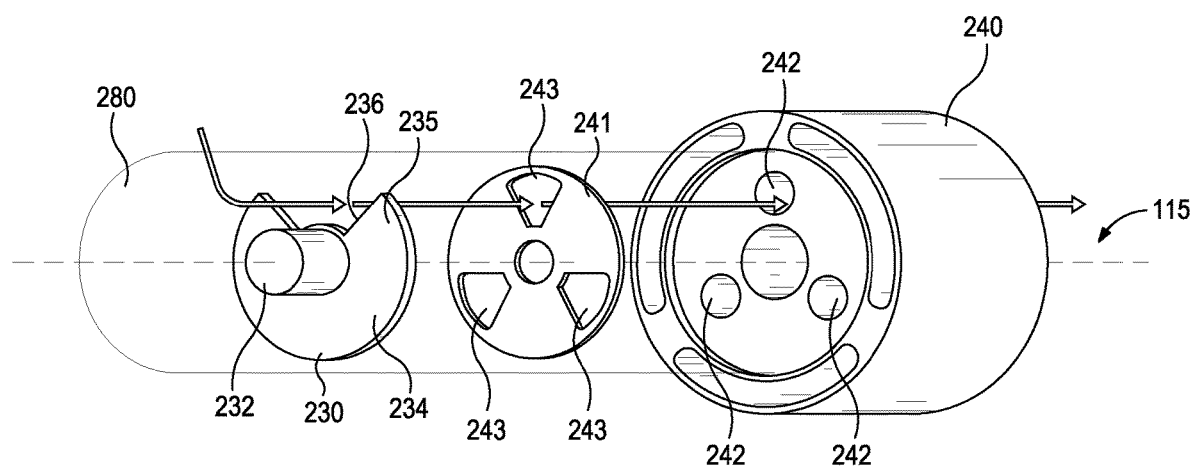
FIG. 4 is a perspective view of a rotary valve and a flow manifold of the drill string steering system of FIG. 3, according to some embodiments of the present disclosure.

FIG. 4 is a perspective view of a rotary valve and a flow manifold of the drill string steering system of FIG. 3, according to some embodiments of the present disclosure. In the depicted example, mud flow through the flow manifold 240 can be controlled by the rotational position of the valve body 230 relative to the flow manifold 240.

In the depicted example, the flow manifold 240 can include a plurality of piston flow channels 242 extending through the flow manifold 240. In some embodiments, the flow manifold 240 includes three piston flow channels 242. The piston flow channels 242 can be circumferentially disposed at a desired radial distance from the rotational axis 115 of the flow manifold 240. In some embodiments, the piston flow channels 242 can have a circular cross-sectional profile.

In the depicted example, the valve body 230 can abut against the flow manifold 240 to selectively direct mud flow into the piston flow channels 242. In some embodiments, a valve seat 241 disposed on an uphole surface of the flow manifold 240 can seal against the valve body 230. The valve seat 241 can include cut-outs 243 corresponding to the cross-sectional shape of the piston flow channels 242.

In the depicted example, to control the flow to the piston flow channels 242, an actuation flow channel 236 of the valve body 230 can be aligned with a desired piston flow channel 242 to allow flow therethrough. By rotating the valve body 230 and therefore the actuation flow channel 236, flow to the corresponding pad pusher can be increased or decreased to control the actuation of the piston and the integrated steering pad. In some embodiments, the filter screen 280 can be disposed around the piston flow channels 242 to filter or remove debris from entering the piston flow channel 242 during actuation.

In the depicted example, the valve body 230 includes a disk-shaped component 234 with a circular outer profile to control the flow through the piston flow channels 242. The disk-shaped component 234 includes an upper surface 235 with a valve shaft 232 extending uphole therefrom, the valve shaft 232 being configured to be coupled to a motor to rotate the valve body 230. The actuation flow channel 236 is formed through the disk-shaped component 234 of the valve body 230. The actuation flow channel 236 can be formed within a circular sector of the disk-shaped component 234. The actuation flow channel 236 can be formed within a circular sector of between 30 degrees to 120 degrees of the disk-shaped component 234, a circular sector of between 45 degrees to 90 degrees of the disk-shaped component 234, a circular sector of between 60 degrees to 75 degrees of the disk-shaped component 234, or a circular sector of between 65 degrees to 70 degrees of the disk-shaped component 234.

Figure 5:
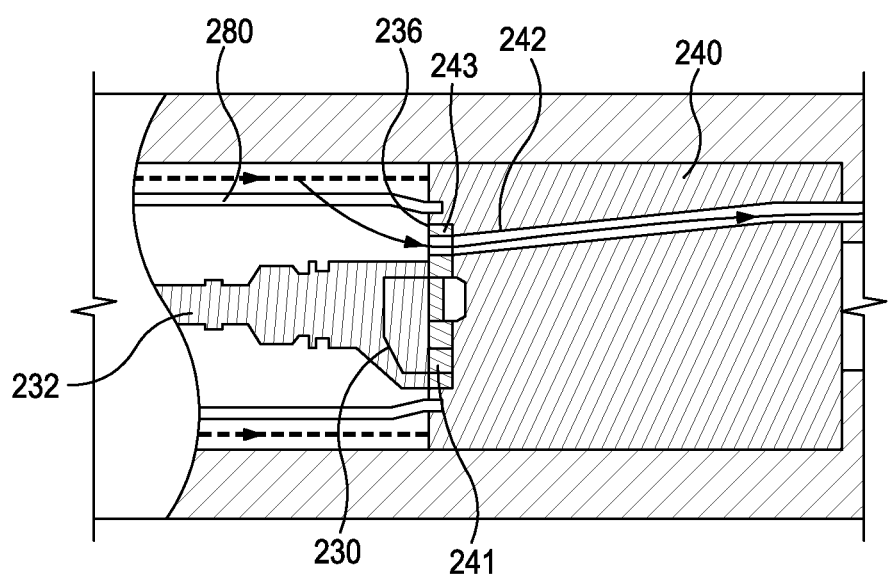
FIG. 5 is a sectional view of the rotary valve and the flow manifold of the drill string steering system of FIG. 3, according to some embodiments of the present disclosure.

FIG. 5 is a sectional view of the rotary valve and the flow manifold of the drill string steering system of FIG. 3, according to some embodiments of the present disclosure. In the depicted example, the valve body 230 can be rotated to a desired flow position to align the actuation flow channel 236 with the desired piston flow channel 242. In the depicted example, the valve shaft 232 is rotated to rotate the valve body 230. The valve body 230 rotates on the valve seat 241 to expose the desired piston flow channel 242 via the actuation flow channel 236. Flow passes through the filter screen 280, through the actuation flow channel 236, the cut-out 243 of the valve seat 241 and into the piston flow channel 242 of the flow manifold 240. In some embodiments, a differential pressure across the filter screen 280 works to restrain the valve body 230 on the valve seat 241.

Figure 6:
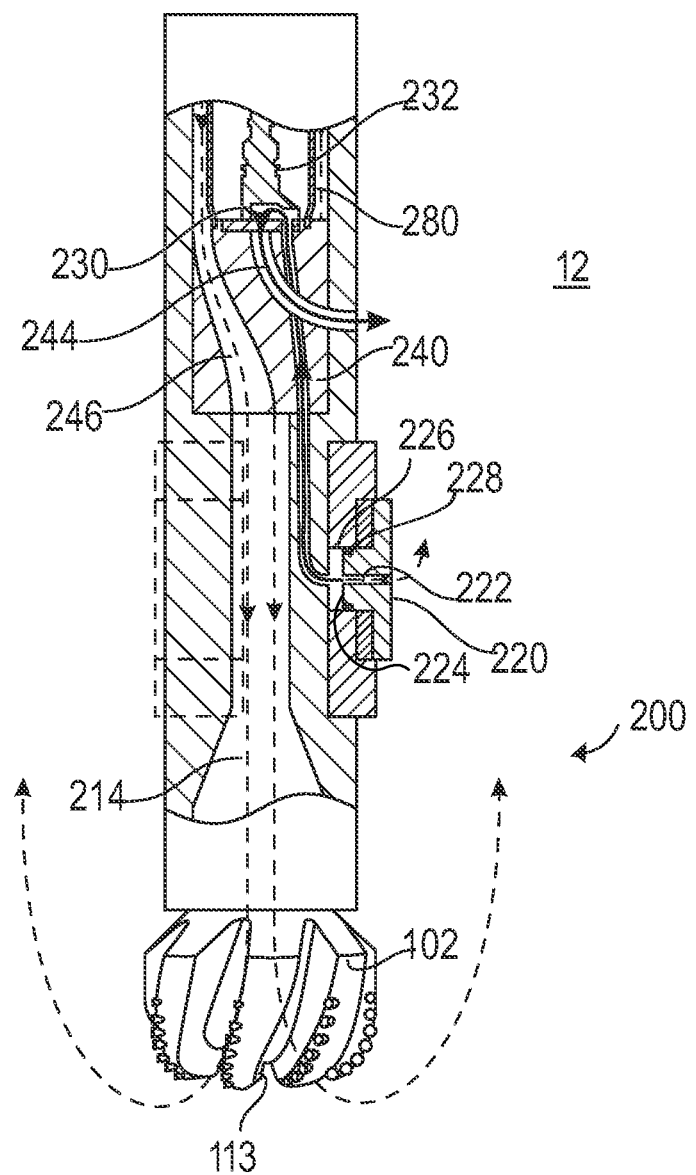
FIG. 6 is a sectional view of the drill string steering system of FIG. 3, according to some embodiments of the present disclosure.

FIG. 6 is a sectional view of the drill string steering system of FIG. 3, according to some embodiments of the present disclosure. In the depicted example, the drill string steering system 200 can facilitate and control the retraction of the pad pushers 223 as the pad pushers 223 are subject to pressure and forces from the wellbore environment. Advantageously, by facilitating the retraction of the pad pushers 223, the steering response of the drill string steering system 200 can be improved, while minimizing the amount of actuation force needed to be applied to actuate pad pushers 223.

In the depicted example, the valve body 230 can be controlled to facilitate steering pad 220 retraction by directing drilling fluid from the piston bore 226 to the annulus of the wellbore 12 via an exhaust channel 244 of the flow manifold 240. In the depicted example, the valve body 230 has sealed off mud flow to the piston 224. As the pad pusher 223 receives pressure from the wellbore environment, the piston 224 of the pad pusher 223 can retract within the piston bore 226. In the depicted example, mud from the piston bore 226 can backflow through the piston flow channel 242 to the valve body 230. The valve body 230 can direct the backflow to the exhaust channel 244 of the flow manifold 240 as the pad 220 is retracted. The backflow from the piston bore 226 can be directed to the annulus of the wellbore 12 via the exhaust channel 244.

In the depicted example, a relief flow channel 222 formed in the pad pusher 223 can further facilitate steering pad 220 retraction by directing drilling fluid through the pad pusher 223 to the annulus of the wellbore 12. Similarly, as the pad pusher 223 receives pressure from the wellbore environment, mud from within the piston bore 226 can flow through the relief flow channel 222 to facilitate retraction of the pad pusher 223.

Figure 7:
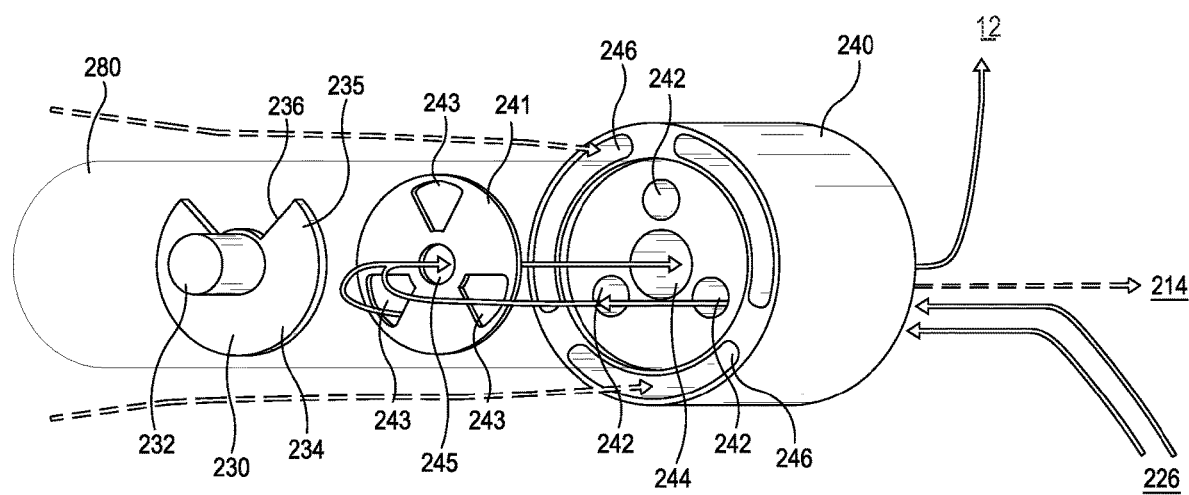
FIG. 7 is a perspective view of a rotary valve and a flow manifold of the drill string steering system of FIG. 6, according to some embodiments of the present disclosure.

FIG. 7 is a perspective view of a rotary valve and a flow manifold of the drill string steering system of FIG. 6, according to some embodiments of the present disclosure. In the depicted example, backflow from piston bores 226 to an exhaust channel 244 can be controlled by the rotational position of the valve body 230 relative to the flow manifold 240.

In the depicted example, the flow manifold 240 can include an exhaust channel 244 in fluid communication with an annulus of the wellbore 12. The exhaust channel 244 can be centrally disposed within the flow manifold 240. In some embodiments, the exhaust channel 244 has a central axis that is coaxial with the rotational axis 115 of the flow manifold 240. The piston flow channels 242 can be circumferentially disposed around and radially spaced apart from the exhaust channel 244. The exhaust channel 244 can have a circular cross-sectional profile. In some embodiments, the valve seat 241 includes a central cut-out 245 corresponding to the exhaust channel 244.

In some embodiments, the valve body 230 rotates about the central axis of the exhaust channel 244. In the depicted example, to control backflow from the piston bores 226 and the piston flow channels 242 to the exhaust channel 244, the disk-shaped component 234 of the valve body 230 can be aligned to link the desired piston flow channels 242 with the exhaust channel 244 in fluid communication. In some embodiments, the sector of the circular profile complimentary to the actuation flow channel 236 can determine the coverage of the disk-shaped component 234 relative to the piston flow channels 242. By rotating the valve body 230 and therefore the disk-shaped component 234, backflow to the exhaust channel 244 from one or more piston flow channels 242 can be increased or decreased to control the retraction of the pad pusher by controlling the flow out of the piston bore 266.

In the depicted example, the flow manifold 240 can include a plurality of bypass flow channels 246 to allow mud flow to pass through the flow manifold 240 to a bypass flow 214 without actuating a steering pad. The bypass flow channels 246 can circumferentially disposed at a desired radial distance from the rotational axis 115 of the flow manifold 240. In some embodiments, the bypass flow channels 246 can be disposed at a radial distance greater than the radial distance of the piston flow channels 246 to allow the bypass flow channels 246 to circumscribe the piston flow channels 242. Similarly, the bypass flow channels 246 can circumscribe the valve seat 241. In some embodiments, the bypass flow channels 246 can have an oblong or ellipsoid cross-sectional profile. In some embodiments, flow through the bypass flow channels 246 can also bypass the filter screen 280, as the bypass flow channels 246 can circumscribe the filter screen 280.

Figure 8:
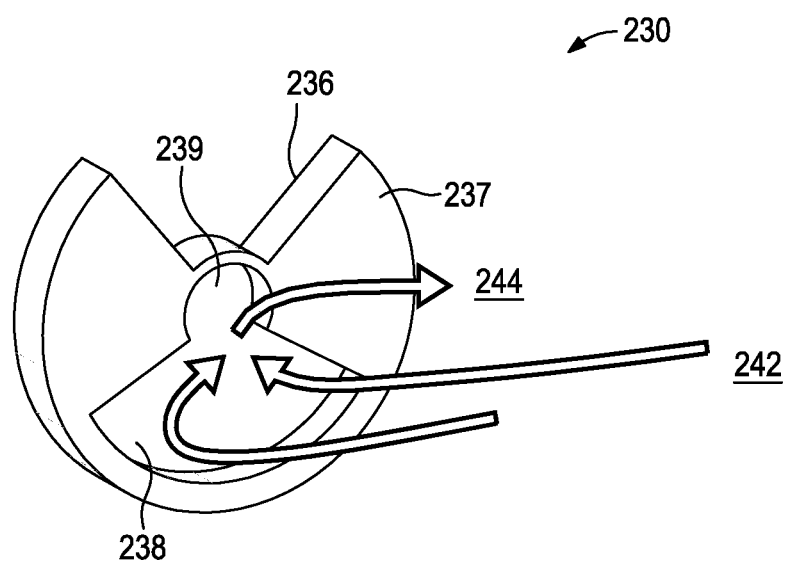
FIG. 8 is a perspective view of a rotary valve of the drill string steering system of FIG. 6, according to some embodiments of the present disclosure.

FIG. 8 is a perspective view of a rotary valve of the drill string steering system of FIG. 6, according to some embodiments of the present disclosure. In the depicted example, the downhole sealing surface 237 of the valve body 230 can seal piston flow channels while the actuation flow channel 236 directs mud flow to the desired piston flow channel. In some embodiments, the sealing surface 237 seals against a valve seat or the flow manifold. In the depicted example, the downhole sealing surface 237 is disposed adjacent to, or otherwise abuts the valve seat.

In the depicted example, a backflow channel 238 is formed in the sealing surface 237 to direct backflow from the piston bores and the piston flow channels 242 to the exhaust channel 244. In some embodiments, the backflow channel 238 receives backflow from the piston flow channels 242. The backflow channel 238 can be recessed portion of the sealing surface 237 to provide a flow path separate from the actuation flow channel 236. The backflow channel 238 can define a circular sector complimentary to or spaced apart from the circular sector formed by the actuation flow channel 236. In some embodiments, the backflow channel 238 can define a circular sector that spans at least one of the piston flow channels 242. In some embodiments, the backflow channel 238 can span two or more piston flow channels 242 to direct the flow to the exhaust channel 244.

In the depicted example, backflow collected by the backflow channel 238 is directed to the central portion 239 of the backflow channel 238 to direct the backflow to the exhaust channel 244 of the flow manifold. The central portion 239 can have at least a partial circular cross-sectional profile. In some embodiments, the central portion 239 has a central axis that is coaxial with the central axis of rotation of the rotary valve and the exhaust channel, allowing for the central portion 239 of the backflow channel 238 to be in fluid communication with the exhaust channel 244 during rotation of the rotary valve.

Figure 9:
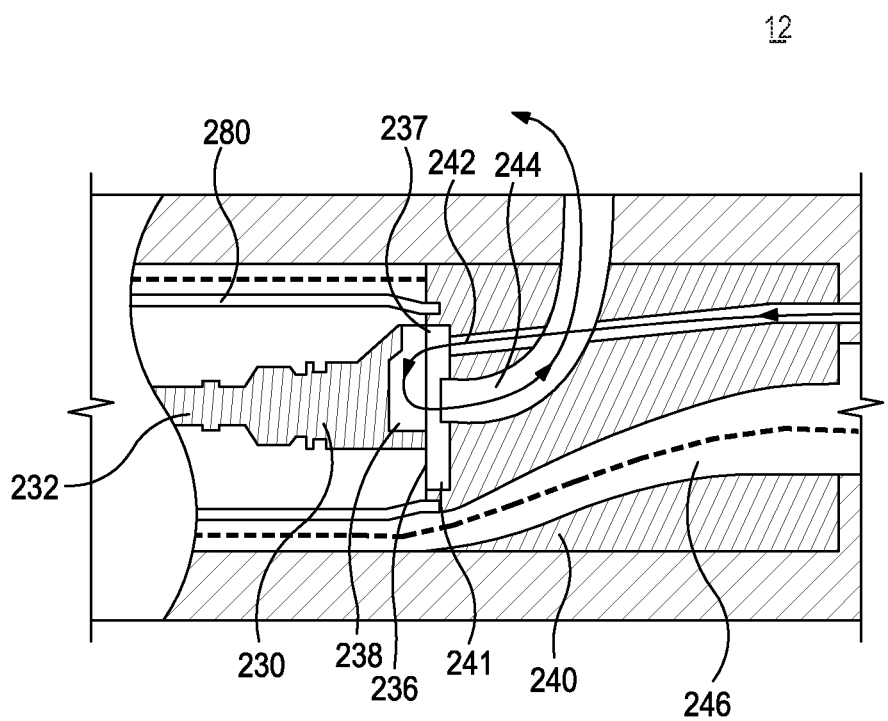
FIG. 9 is a sectional view of the rotary valve and the flow manifold of the drill string steering system of FIG. 6, according to some embodiments of the present disclosure.

FIG. 9 is a sectional view of the rotary valve and the flow manifold of the drill string steering system of FIG. 6, according to some embodiments of the present disclosure. In the depicted example, the valve body 230 can be rotated to a desired flow position to align the backflow channel 238 with the desired piston flow channel 242. In the depicted example, the valve shaft 232 is rotated to rotate the valve body 230. The valve body 230 rotates on the valve seat 241 to place the desired piston flow channel 242 in fluid communication with the exhaust channel 244 via the backflow channel 238 while also sealing the desired piston flow channels 242 from actuating flow via the sealing surface 237. Backflow passes through the piston flow channel 242, through the backflow channel 238 to the exhaust channel 244 to be exhausted to the annulus of the wellbore 12. In some embodiments, the valve body 230 can further provide actuating flow to another piston flow channel 242 aligned with the actuation flow channel 236.

Figure 10:
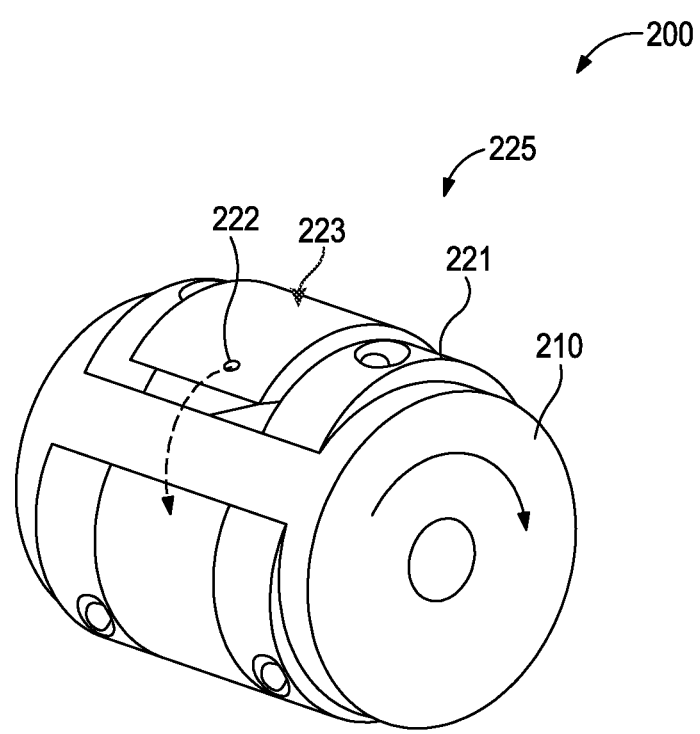
FIG. 10 is a perspective view of drill string steering system, according to some embodiments of the present disclosure.

FIG. 10 is a perspective view of drill string steering system, according to some embodiments of the present disclosure. In the depicted example, a steering head 225 of the drill string steering system 200 is shown. In some embodiments, the steering head 225 includes one or more pad pushers 223 each disposed in a pad retention housing 221. Although FIG. 10 depicts two pad pushers 223, the disclosed embodiments are not limited to this configuration.

In some embodiments, the steering head 225 includes two or more, and more specifically, three pad pushers 223. In the depicted example, the relief flow channel 222 of the pad pusher 223 is formed there through to facilitate and control the retraction of the pad pusher 223. By allowing for flow through the relief flow channel 222, the pad pusher 223 can be retracted without compressing trapped fluid in a piston bore.

Figure 11:
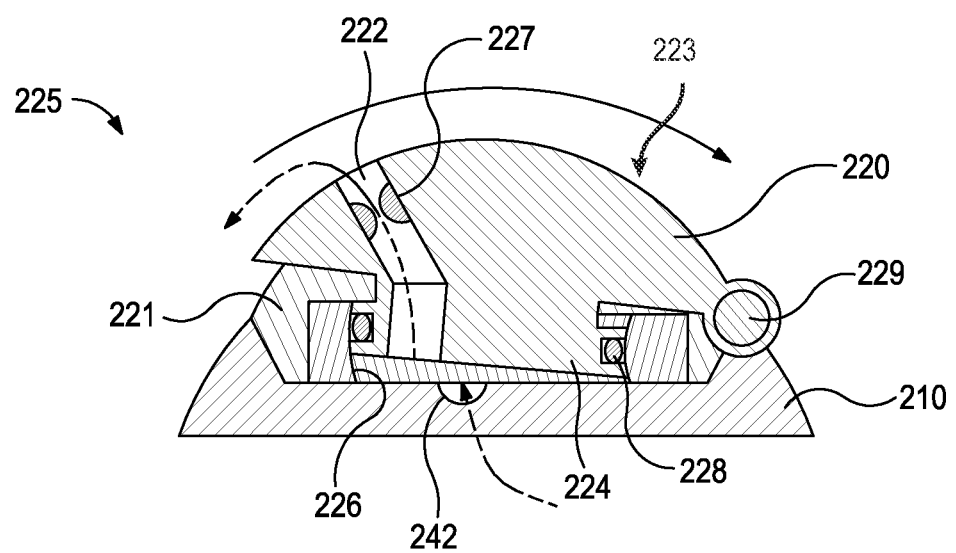
FIG. 11 is a sectional view of a steering head of the drill string steering system of FIG. 10, according to some embodiments of the present disclosure.

FIG. 11 is a sectional view of a steering head of the drill string steering system of FIG. 10, according to some embodiments of the present disclosure. In the depicted example, the steering head 225 includes a pad pusher 223 disposed within a pad retention housing 221. As depicted, the steering pad 220 and the piston 224 may be coupled to each other using any suitable coupling mechanism. The pad pusher 223 can be an integrally formed steering pad 220 and piston 224. In some embodiments, the steering pad 220 and the piston 224 are formed as a single part from a continuous material to form an integrally formed pad pusher 223. In yet other embodiments, however, the piston 224 and the steering pad 220 may be separate components, with the piston 224 being actuatable to contact and move the steering pad 220. In some embodiments, the steering pad 220 can have a semi-circular cross-sectional profile. In some embodiments, the pad pusher 223 can be attached to the tool body 210 via a pivot coupling 229.

In the depicted example, the pad pusher 223 can be actuated by receiving mud flow in the piston bore 226 from the piston flow channel 242. A piston seal 228 prevents the migration of fluid out of the piston bore 226. During actuation, the relief flow channel 222 can control the actuation force of the pad pusher 223. As the pad pusher 223 extends, the steering pad 220 can pivot about the pivot coupling 229 relative to the tool body 210.

In the depicted example, the relief flow channel 222 formed in the pad pusher 223 can control the rate of retraction of the pad pusher 223. In some embodiments, the rate of retraction of the pad pusher 223 can be modified by adjusting the size of the relief flow channel 222. In some embodiments, the orientation of the outlet of the relief flow channel 222 can be configured to be exhausted behind the steering pad 220 with respect to the direction of rotation of the tool body 210. Advantageously, the relief flow channel 222 can be utilized to tailor the amount of force exerted on the pad pusher 223. Further, the relief flow channel 222 can remove debris or otherwise clean out the area surrounding the pad pusher 223.

In some embodiments, the rate of retraction of the pad pusher 223 can be modified by the addition of a choke valve 227 in the flow path of the relief flow channel 222. In some embodiments, characteristics of the choke valve 227 can be selected to provide a desired steering pad 220 response. For example, a wider choke valve 227 can provide less steering pad 220 force during actuation. Further, a smaller choke valve 227 can provide an increase retraction time for the steering pad 220. The steering pad 220 response can be selected based on an intended formation as well as an intended rotational speed. Selection of the choke size can be dependent upon various other hydraulic parameters the steering tool will be operating in such as anticipated ranges of drilling mud viscosity, drilling mud density, drilling mud flow rate and desired pressure difference needed in the piston chamber verses the wellbore when the steering pad needs to push against the wellbore.

Various examples of aspects of the disclosure are described below as clauses for convenience. These are provided as examples, and do not limit the subject technology.

Clause 1. A flow manifold for facilitating steering of a drill string, the flow manifold comprising: a body having a rotational axis and including a plurality of bypass flow channels, a plurality of piston flow channels, and an exhaust channel, the plurality of bypass flow channels extending through the body and being positioned at a first radial distance from the rotational axis, the plurality of piston flow channels extending through the body and being positioned at a second radial distance from the rotational axis, the first radial distance being greater than the second radial distance, the plurality of bypass flow channels and the exhaust channel permitting flow through the cylindrical body to a location downhole of the flow manifold, wherein each of the plurality of piston flow channels is fluidly communicated with a piston bore for actuating a piston to steer a direction of the drill string, and the exhaust channel is in fluid communication with an annulus.

Clause 2. The flow manifold of Clause 1, further comprising a valve seat formed onto an uphole face of the body.

Clause 3. The flow manifold of Clause 2, wherein the valve seat comprises a plurality of cut-outs corresponding to the plurality of piston flow channels.

Clause 4. The flow manifold of Clause 2, wherein the valve seat comprises a central cut-out corresponding to the exhaust channel.

Clause 5. The flow manifold of Clause 2, wherein the valve seat is circumscribed by the plurality of bypass flow channels.

Clause 6. The flow manifold of any preceding Clause, wherein the body is cylindrical in shape, and the exhaust channel comprises a central axis that is coaxial with the rotational axis of the cylindrical body.

Clause 7. The flow manifold of any preceding Clause, wherein the exhaust channel comprises a circular cross-sectional profile.

Clause 8. The flow manifold of any preceding Clause, wherein each of the plurality of piston flow channels comprises a circular cross-sectional profile.

Clause 9. The flow manifold of any preceding Clause, wherein each of the plurality of bypass flow channels comprises an oblong cross-sectional profile.

Clause 10. The flow manifold of any preceding Clause, wherein the piston flow channels are radially spaced apart from the exhaust channel.

Clause 11. The flow manifold of any preceding Clause, further comprising a filter screen disposed around the plurality of piston flow channels.

Clause 12. The flow manifold of any preceding Clause, wherein the piston includes a relief flow channel formed through the piston for controlling a rate of retraction of the piston.

Clause 13. The flow manifold of Clause 12, further comprising a choke valve in fluid communication with the relief flow channel to control a rate of flow through the relief flow channel.

Clause 14. The flow manifold of any preceding Clause, further comprising a piston seal disposed between the piston and the piston bore.

Clause 15. A rotary valve for facilitating steering of a drill string, the rotary valve comprising: a valve body having a disk-shaped component and a valve shaft coupled to and extending uphole from the disk-shaped component, wherein the disk-shaped component has a circular outer profile permitting the valve body to be rotatable within the drill string, the disk-shaped component having: an uphole surface and an opposing downhole sealing surface; an actuation flow channel formed within a first circular sector of the disk-shaped component; and a backflow channel recessed into the downhole sealing surface, the backflow channel being disposed within a second circular sector of the disk-shaped component, spaced apart from the first circular sector of the actuation flow channel for providing a flow path separate from flow through the actuation flow channel, wherein the actuation flow channel and the backflow channel are rotatable within the drill string to permit flow toward or away from pistons of the drill string for controlling actuation of the pistons.

Clause 16. The rotary valve of Clause 15, wherein the first circular sector is defined by a central angle of between about 30 degrees and about 120 degrees.

Clause 17. The rotary valve of Clause 15 or 16, wherein the first circular sector is defined by a central angle of between about 45 degrees and about 90 degrees.

Clause 18. The rotary valve of Clauses 15-17, wherein the first circular sector is defined by a central angle of between about 60 degrees and about 75 degrees.

Clause 19. The rotary valve of Clauses 15-18, wherein the first circular sector is defined by a central angle of between about 65 degrees and about 70 degrees.

Clause 20. The rotary valve of Clauses 15-19, further comprising a motor to rotate the valve body.

Clause 21. The rotary valve of Clause 20, wherein the motor includes a motor housing containing lubricant.

Clause 22. The rotary valve of Clause 21, wherein the motor housing includes a compensation piston to pressurize the lubricant.

Clause 23. The rotary valve of Clause 22, wherein the motor housing includes a biasing spring coupled to the compensation piston to bias the compensation piston and pressurize the lubricant.

Clause 24. The rotary valve of Clause 21, further comprising a turbine to generate power for the motor.

Clause 25. A drill string steering system comprising the flow manifold of Clause 1 and the rotary valve of Clause 15, wherein the actuation flow channel and the backflow channel are rotatable with respect to the piston flow channels, the actuation flow channel being rotatable relative to the flow manifold to increase or decrease flow toward the piston for controlling actuation of the piston and the backflow channel being rotatable relative to the flow manifold to increase or decrease flow away from the piston to the annulus for controlling retraction of the piston.

Clause 26. The steering system of Clause 25, wherein the sealing surface is disposed adjacent to the valve seat.

Clause 27. The steering system of Clause 25, wherein the backflow channel rotates about the exhaust channel.

Clause 28. The steering system of Clause 25, wherein the backflow channel spans between one of the plurality of piston flow channels and the exhaust channel.

Clause 29. The steering system of Clause 25, wherein the backflow channel spans at least two of the plurality of piston flow channels.

Clause 30. A steering system for a drill string, the system comprising: a tool body defining a rotational axis, the tool body having a plurality of piston bores and a plurality of piston flow channels in fluid communication with the plurality of piston bores; a plurality of pad pushers coupled to the tool body and movable relative to the tool body for steering the drill string, each pad pusher including: a piston movable within the piston bore; a steering pad; and a relief flow channel formed through the piston and the steering pad for permitting flow through the pad pusher to permit movement of the steering pad from an extended position toward a retracted position, the steering pad being moveable between the extended and retracted positions for steering a direction of a drill string.

Clause 31. The steering system of Clause 30, further comprising a choke valve in fluid communication with the relief flow channel to control a rate of flow through the relief flow channel.

Clause 32. The steering system of Clauses 30 or 31, further comprising a piston seal disposed between the piston and the piston bore.

Clause 33. The steering system of Clauses 30-32, wherein the steering pad is integrally formed with the piston, and the pad pusher is pivotably coupled to the tool body.

Clause 34. The steering system of Clauses 30-33, further comprising: a flow manifold including a cylindrical body having a rotational axis and including a plurality of bypass flow channels, a plurality of piston flow channels, and an exhaust channel, the plurality of bypass flow channels extending through the cylindrical body and being positioned at first radial distance from the rotational axis, the plurality of piston flow channels extending through the cylindrical body and being positioned at second radial distance from the rotational axis, the first radial distance being greater than the second radial distance, the plurality of bypass flow channels and the exhaust channel permitting flow through the cylindrical body to a location downhole of the flow manifold, wherein each of the plurality of piston flow channels is fluidly communicated with a piston bore for actuating a piston to steer a direction of the drill string, and the exhaust channel is in fluid communication with an annulus; and a valve body having a disk-shaped component and a valve shaft coupled to and extending uphole from the disk-shaped component, wherein the disk-shaped component has a circular outer profile permitting the valve body to be rotatable within the drill string, the disk-shaped component having: an uphole surface and an opposing downhole sealing surface; an actuation flow channel formed within a first circular sector of the disk-shaped component; and a backflow channel recessed into the downhole sealing surface, the backflow channel being disposed within a second circular sector of the disk-shaped component, spaced apart from the first circular sector of the actuation flow channel for providing a flow path separate from flow through the actuation flow channel.

Clause 35. The steering system of Clause 34, further comprising a valve seat formed onto an uphole face of the cylindrical body.

Clause 36. The steering system of Clause 35, wherein the valve seat comprises a plurality of cut-outs corresponding to the plurality of piston flow channels.

Clause 37. The steering system of Clause 35, wherein the valve seat comprises a central cut-out corresponding to the exhaust channel.

Clause 38. The steering system of Clause 35, wherein the valve seat is circumscribed by the plurality of bypass flow channels.

Clause 39. The steering system of Clause 35, wherein the sealing surface is disposed adjacent to the valve seat.

Clause 40. The steering system of Clause 34 wherein the exhaust channel comprises a central axis that is coaxial with the rotational axis of the cylindrical body.

Clause 41. The steering system of Clause 34, wherein the exhaust channel comprises a circular cross-sectional profile.

Clause 42. The steering system of Clause 34, wherein each of the plurality of piston flow channels comprises a circular cross-sectional profile.

Clause 43. The steering system of Clause 34, wherein each of the plurality of bypass flow channels comprises an oblong cross-sectional profile.

Clause 44. The steering system of Clause 34, wherein the piston flow channels are radially spaced apart from the exhaust channel.

Clause 45. The steering system of Clause 34, further comprising a filter screen disposed around the plurality of piston flow channels.

Clause 46. The steering system of Clause 34, wherein the piston includes a relief flow channel formed through the piston for controlling a rate of retraction of the piston.

Clause 47. The steering system of Clause 46, further comprising a choke valve in fluid communication with the relief flow channel to control a rate of flow through the relief flow channel.

Clause 48. The steering system of Clause 46, further comprising a piston seal disposed between the piston and the piston bore.

Clause 49. The steering system of Clause 34, wherein the first circular sector is defined by a central angle of between about 30 degrees and about 120 degrees.

Clause 50. The steering system of Clause 34, wherein the first circular sector is defined by a central angle of between about 45 degrees and about 90 degrees.

Clause 51. The steering system of Clause 34, wherein the first circular sector is defined by a central angle of between about 60 degrees and about 75 degrees.

Clause 52. The steering system of Clause 34, wherein the first circular sector is defined by a central angle of between about 65 degrees and about 70 degrees.

Clause 53. The steering system of Clause 34, further comprising a motor to rotate the valve body.

Clause 54. The steering system of Clause 53, wherein the motor includes a motor housing containing lubricant.

Clause 55. The steering system of Clause 54, wherein the motor housing includes a compensation piston in fluid communication with the lubricant and the annulus.

Clause 56. The steering system of Clause 55, wherein the motor housing includes a biasing spring coupled to the compensation piston to bias the compensation piston and pressurize the lubricant.

Clause 57. The steering system of Clause 53, further comprising a turbine to generate power for the motor.

Clause 58. The steering system of Clause 34, wherein the backflow channel rotates about the exhaust channel.

Clause 59. The steering system of Clause 34, wherein the backflow channel spans between one of the plurality of piston flow channels and the exhaust channel.

Clause 60. The steering system of Clause 34, wherein the backflow channel spans at least two of the plurality of piston flow channels.

Clause 61. A method of steering a drill string, the method comprising: drilling into a subterranean formation with a drill bit operatively coupled to a drill string steering system, the drill string steering system including a valve body rotatable relative to a flow manifold, the valve body including a backflow channel and an actuation flow channel; and rotating the valve body to align the actuation flow channel with respect to a piston flow channel extending through the flow manifold for controlling actuation of a piston and the backflow channel being rotatable relative to the flow manifold to increase or decrease flow away from the piston to the annulus for controlling retraction of the piston.

Clause 62. The method of Clause 61, wherein the backflow channel rotates about an exhaust channel of the flow manifold.

Clause 63. The method of Clauses 61 or 62, further comprising bypassing flow past the flow manifold to a bit nozzle of a drill bit via a bypass channel formed through the manifold.

Clause 64. The method of Clauses 61-63, further comprising filtering flow through the flow manifold via a filter screen disposed around the valve body.

Clause 65. The method of Clauses 61-64, wherein the actuation flow channel is disposed within the filter screen.

Clause 66. The method of Clauses 61-65, further comprising rotating the valve body via a motor.

Clause 67. The method of Clause 66, further comprising generating power for the motor via a turbine exposed to flow.

Clause 68. The method of Clauses 61-67, wherein the piston flow channel comprises a plurality of piston flow channels.

Clause 69. The method of Clauses 61-68, further comprising controlling flow through the piston via a relief flow channel formed through the piston to retract the piston.

Clause 70. The method of Clause 69, further comprising controlling a rate of flow through the relief flow channel via a choke valve.

What is claimed is:

1. A flow manifold for facilitating steering of a drill string, the flow manifold comprising:
a body having a rotational axis and including a plurality of bypass flow channels, a plurality of piston flow channels, and an exhaust channel, the plurality of bypass flow channels extending through the body and being positioned at a first radial distance from the rotational axis, the plurality of piston flow channels extending through the body and being positioned at a second radial distance from the rotational axis, the first radial distance being greater than the second radial distance, the plurality of bypass flow channels and the exhaust channel permitting flow through the body to a location downhole of the flow manifold, wherein each of the plurality of piston flow channels is fluidly communicated with a piston bore for actuating a piston to steer a direction of the drill string, and the exhaust channel is in fluid communication with an annulus.

2. The flow manifold of claim 1, further comprising a valve seat formed onto an uphole face of the body, the valve seat including a plurality of cut-outs corresponding to the plurality of piston flow channels, wherein a central cut-out of the plurality of cut-outs corresponds to the exhaust channel.

3. The flow manifold of claim 1, wherein the body is cylindrical in shape, and the exhaust channel comprises a central axis that is coaxial with the rotational axis of the cylindrical body.

4. The flow manifold of claim 1, wherein the piston flow channels are radially spaced apart from the exhaust channel.

5. The flow manifold of claim 1, further comprising a filter screen disposed around the plurality of piston flow channels.

6. The flow manifold of claim 1, wherein the piston includes a relief flow channel formed through the piston for controlling a rate of retraction of the piston.

7. The flow manifold of claim 6, further comprising a choke valve in fluid communication with the relief flow channel to control a rate of flow through the relief flow channel.

8. A steering system for a drill string, the system comprising:
- a tool body defining a rotational axis, the tool body having a plurality of piston bores and a plurality of piston flow channels in fluid communication with the plurality of piston bores;
- a plurality of pad pushers coupled to the tool body and movable relative to the tool body for steering the drill string, each pad pusher including:
  - a piston movable within a respective one of the piston bores;
  - a steering pad; and
  - a relief flow channel formed through the piston and the steering pad for permitting flow through the pad pusher to permit movement of the steering pad from an extended position toward a retracted position, for steering a direction of the drill string;
- a flow manifold including a body having a rotational axis and including a plurality of bypass flow channels, a plurality of piston flow channels, and an exhaust channel, the plurality of bypass flow channels extending through the body and being positioned at first radial distance from the rotational axis, the plurality of piston flow channels extending through the body and being positioned at second radial distance from the rotational axis, the first radial distance being greater than the second radial distance, the plurality of bypass flow channels and the exhaust channel being permitting flow through the body to a location downhole of the flow manifold, wherein each of the plurality of piston flow channels is fluidly communicated with a respective one of the piston bores for actuating a respective one of the pistons to steer a direction of the drill string, and the exhaust channel is in fluid communication with an annulus; and
- a valve body having a disk-shaped component and a valve shaft coupled to and extending uphole from the disk-shaped component,
  wherein the disk-shaped component has a circular outer profile permitting the valve body to be rotatable about the flow manifold, the disk-shaped component having:
  - an uphole surface and an opposing downhole sealing surface;
  - an actuation flow channel formed within a first circular sector of the disk-shaped component; and
- a backflow channel recessed into the downhole sealing surface, the backflow channel being disposed within a second circular sector of the disk-shaped component, spaced apart from the first circular sector of the actuation flow channel for providing a flow path separate from flow through the actuation flow channel.

9. The steering system of claim 8, further comprising a choke valve in fluid communication with the relief flow channel to control a rate of flow through the relief flow channel.

10. The steering system of claim 8, further comprising a piston seal disposed between the piston and the respective one of the piston bores.

11. The steering system of claim 8, wherein the steering pad is integrally formed with the piston, and the pad pusher is pivotably coupled to the tool body.

12. The steering system of claim 8, wherein the backflow channel rotates about the exhaust channel.

13. The steering system of claim 8, wherein the backflow channel spans between one of the plurality of piston flow channels and the exhaust channel.

14. The steering system of claim 8, wherein the backflow channel spans at least two of the plurality of piston flow channels.

* * * * *